E. A. TANNER.
AUTOMOBILE LOCK.
APPLICATION FILED JAN. 14, 1920.
1,382,570.
Patented June 21, 1921.
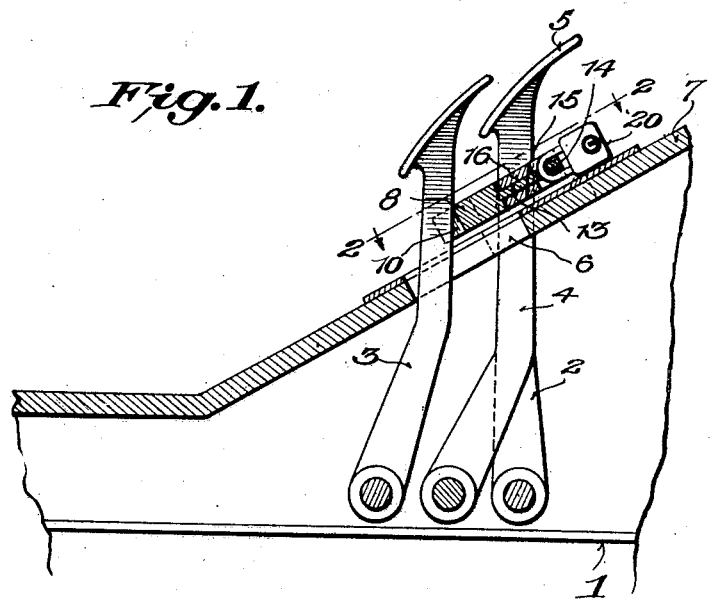
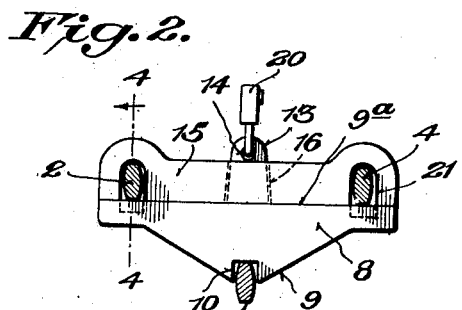
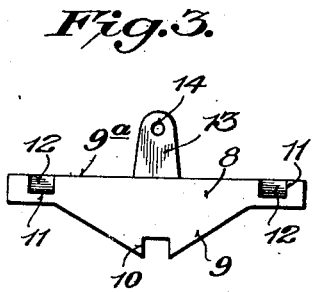
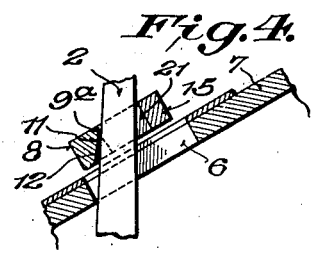
Witness
Chas. L. Griesbauer
Inventor
Elmer A. Tanner,
By Bollinger & Block,
Attorneys

UNITED STATES PATENT OFFICE.

ELMER A. TANNER, OF DELTA, IOWA.

AUTOMOBILE-LOCK.

1,382,570.  Specification of Letters Patent.  Patented June 21, 1921.

Application filed January 14, 1920. Serial No. 351,443.

*To all whom it may concern:*

Be it known that I, ELMER A. TANNER, a citizen of the United States, residing at Delta, in the county of Keokuk and State of Iowa, have invented certain new and useful Improvements in Automobile-Locks, of which the following is a specification.

The invention relates to improvements in a locking device for the control levers of automobiles, and is primarily intended for application to Ford cars.

The gear controlling levers of Ford cars are disposed so that they normally lie in horizontal alinement, at which time the high speed gear is in mesh while the reversing gear is in neutral, and it is the object of the present invention to provide a locking device coöperating with said levers so as to maintain the same in such a position as to set the high gear in mesh and likewise place the reverse gear into mesh thereby positively locking the machine against theft or unauthorized use.

With the foregoing conception in mind, the invention comprises a locking device adapted to be interposed between the forward speed controlling lever and reversing lever of an automobile to separate the same and to maintain the gears controlled thereby in mesh, and adapted to be positively secured or locked to one of the levers. In carrying out the invention the locking device preferably comprises a body portion having a tapered forward part the apex of which is formed with a socket to receive one of the automobile levers, while the opposite side of the body is provided with spaced pockets having inclined side walls for receiving the forward speed and brake levers of a machine when the body is interposed between said levers. The bevel walls of the pockets facilitate the entrance of the body between the levers and serve to wedge said levers apart, after which application of the body a suitable yoke surrounding the forward speed and reversing levers is positively united to the body by a locking device.

The invention, therefore, aims to provide a locking device for automobiles which can be instantly applied to a Ford car so as to lock the same against theft but with ease can be removed from the car when the lawful owner desires to use the same.

In the accompanying drawings I have disclosed a single embodiment of the invention but it will be understood that this disclosure is merely for the purpose of illustration and that the same may be subject to many changes without departing from the spirit of the invention.

In the drawings:

Figure 1 represents a view of the device applied to the controlling pedals of an automobile; and, Fig. 2 is a detail view of the locking device.

Fig. 3 is a view of one of the locking members; and,

Fig. 4 is a sectional view on line 2—2 of Fig. 1.

Referring now more particularly to the drawings the numeral 1 designates an automobile, preferably of the Ford type having the forward gear controlling lever 2, the reverse gear controlling lever 3, and the brake lever 4 all of which is common to the usual Ford automobile. These levers, of course, carry foot pedals 5 and are movable in the slots 6 disposed within the floor board 7 for the purpose of inspecting the machine to be controlled.

It will be understood that these levers when in a normal position are disposed in horizontal alinement and when in such alinement the forward speed controlling lever 2 has its high gear in mesh, the reversing gear at this time being in neutral. To lock the machine against theft or unauthorized use a locking device is employed comprising a body 8 having a tapered forward part 9 the apex of said forward part being formed with a socket 10 that engages the rear portion of the reversing lever 3, moving said lever away from the forward speed controlling levers 2 and 4. The reversing lever is held in this position whereby its reversing gear is in mesh, and it will be apparent that when the device is so interposed between the reversing lever and the forward gear controlling lever, both the reversing gear and the driving gear for moving the vehicle in a forward direction are in mesh. The body 8 along its straight side 9 is formed with a pair of relatively narrow separated pockets 11, having tapering side walls 12 which engage the reversing and brake levers and facilitate the entrance of the body between said levers and the brake lever by what may be termed a wedging action. The body 8 is likewise formed with a central forwardly projecting tongue 13 having an aperture 14 therein near its outer end for a purpose which will later appear.

To the body of the locking device a yoke 15 is attached when the device is to be installed on a machine, said yoke having a central opening 16 receiving the tongue 13 by which the two parts of the device are united, and to maintain said parts in a locked position a suitable pad lock 20 or the like is employed, the shackle of which passes through the aperture 14 in the tongue 13. The yoke 15 near each end is slightly widened and is formed with sockets 21 that are adapted to provide a space in conjuction with the pockets 11 to receive the forward speed and brake levers 2 and 4. The walls of the sockets 21 of course prevent lateral displacement of the device and positively lock the same to said levers when the pad lock 20 is secured to the tongue 13 of the body, so that it is impossible for any one to use the machine inasmuch as both the high speed gears and the reversing gears are both in mesh and it would be impossible to start the engine under these conditions.

Having thus described the parts of the locking device, the application of the same to the controlling levers may be briefly reviewed as follows:

When a machine is to be locked to prevent theft or unauthorized use thereof, the yoke 16 is separated from the body 8, and the body interposed between the reverse lever 3 and the high speed and brake levers 2 and 4 separating said levers to set the gears controlled by the reversing and forward speed lever both in a meshing position. When the body is applied, the reversing gear lever is of course set in the socket 10, while the other levers are received by the pockets 11. By forcing the body downwardly a separation of these levers is effected and the inclined wall 12 of the pockets 11 facilitate the entrance of the body between the gears. When the body has thus been positioned the yoke 16 is applied, the sockets 21 therein surrounding the brake and forward speed controlling levers and a suitable pad lock is passed through the aperture in the tongue 13. This positively prevents the removal of the locking device from the levers by an unauthorized person yet the lawful owner with ease can remove the pad lock to enable the yoke to be removed after which the body may be easily disengaged from the gear levers.

Having thus described the invention what I claim is:

A locking device for transmission controlling levers having a body portion, the forward end of which is tapered, the apex of the body being cut away to provide a relatively large socket adapted to receive and engage one of the controlling levers, the opposite side of the body having spaced sockets therein with inclined walls, said body also having a projection extending from the central part thereof, and a yoke coöperating with said projection, and having pockets therein receiving with the inclined sockets the other controlling levers.

In testimony whereof I affix my signature in the presence of two witnesses.

ELMER A. TANNER.

Witnesses:
H. W. BOLDORER,
NORMAN MANLEY.